(12) United States Patent
Trotta et al.

(10) Patent No.: US 12,443,740 B2
(45) Date of Patent: **\*Oct. 14, 2025**

(54) DATA MANAGEMENT PLATFORM

(71) Applicant: Citibank, N.A., New York, NY (US)

(72) Inventors: Walter Trotta, Cranford, NJ (US);
Vaibhav Kumar, Monroe, NJ (US);
Samuel J. Kass, Oberrieden (CH);
Sasisekar Shanmugasundaram,
Warsaw (PL)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/094,636

(22) Filed: Mar. 28, 2025

(65) Prior Publication Data
US 2025/0252204 A1    Aug. 7, 2025

Related U.S. Application Data

(63) Continuation of application No. 18/134,883, filed on Apr. 14, 2023, now Pat. No. 12,277,243.

(51) Int. Cl.
*G06F 21/00* (2013.01)
*G06F 21/62* (2013.01)

(52) U.S. Cl.
CPC .............................. *G06F 21/6218* (2013.01)

(58) Field of Classification Search
CPC ............. G06F 21/6218; G06F 21/6227; G06F 21/6245; H04L 63/105
See application file for complete search history.

(56) References Cited

U.S. PATENT DOCUMENTS

| 2016/0078245 | A1 | 3/2016 | Amarendran et al. |
| 2017/0054689 | A1* | 2/2017 | Hughes ............... H04L 63/0421 |
| 2017/0098099 | A1 | 4/2017 | Mattsson |
| 2019/0147170 | A1 | 5/2019 | Keselman et al. |
| 2020/0336472 | A1 | 10/2020 | Drummond et al. |
| 2020/0382510 | A1 | 12/2020 | Dunjic et al. |

(Continued)

OTHER PUBLICATIONS

U.S. Appl. No. 18/134,883, filed Apr. 14, 2023, Pending.

(Continued)

*Primary Examiner* — Joseph P Hirl
*Assistant Examiner* — Chi D Nguy
(74) *Attorney, Agent, or Firm* — Perkins Coie LLP

(57) ABSTRACT

A network system to allow global usage of data while allowing regional jurisdictions control over sensitive data. Different jurisdictions may declare different types of data as sensitive data that is not to be discoverable by a third party. The system allows the data to be shared across jurisdiction boundaries with complete auditability, traceability, and compliance. The system allows a first jurisdiction computing device to control the usage of the data that is stored outside of the jurisdiction. The technology allows the first jurisdiction to propagate rules, tokenization protocols, and updates to the system to manage the sensitive data. The system detokenizes the data when the data is to be used for an approved purpose by an approved party. If the original jurisdiction has a change in permissions for sensitive data, the jurisdiction can propagate a tokenization to all data stored in the data management system outside of the jurisdiction.

20 Claims, 5 Drawing Sheets

(56) References Cited

U.S. PATENT DOCUMENTS

| | | | |
|---|---|---|---|
| 2020/0387623 A1* | 12/2020 | Bayon | H04L 9/3242 |
| 2021/0133349 A1* | 5/2021 | Jensen | G06F 21/6245 |
| 2021/0304143 A1* | 9/2021 | Lucas | G06F 21/6245 |
| 2022/0179986 A1* | 6/2022 | Veeramachaneni | G06F 3/0637 |
| 2022/0198059 A1* | 6/2022 | Hatcher | G06F 21/606 |
| 2023/0134781 A1 | 5/2023 | Senerth et al. | |
| 2023/0195932 A1* | 6/2023 | Carnesecca | G06F 21/6245 726/26 |
| 2023/0289457 A1* | 9/2023 | Kvalnes | G06F 21/6245 |
| 2024/0346164 A1 | 10/2024 | Trotta et al. | |

OTHER PUBLICATIONS

Office Action Non-Final issued Dec. 4, 2024, in U.S. Appl. No. 18/818,560 (11 pages).

Notice of Allowance issued Mar. 26, 2025, in U.S. Appl. No. 18/818,560 (23 pages).

* cited by examiner

DATA MANAGEMENT PLATFORM

CROSS-REFERENCE TO RELATED APPLICATIONS

This application is a continuation of U.S. patent application Ser. No. 18/134,883, filed Apr. 14, 2023. The content of the foregoing application is incorporated herein in its entirety by reference.

FIELD OF THE INVENTION

The technology relates generally to the field of global data management, and more particularly to methods and systems to provide data management security across jurisdictional boundaries using tokenization of sensitive data.

BACKGROUND OF THE INVENTION

Institutions, governments, and other entities are protective of sensitive data of constituents and citizens in their jurisdictions. Data that is generated in a particular jurisdiction, associated with users in that jurisdiction, or owned or possessed by entities residing in the jurisdiction may include sensitive data. Sensitive data may be data that can be used to identify a person, data that is related to financial or political dealings, data that is private or protected, data that may be used by malicious actors for illicit purposes, or any other data that the jurisdiction or the people in the jurisdiction would like to protect from unauthorized usage.

Some jurisdictions, such as certain countries or states, have typically not allowed sensitive data from that jurisdiction to be stored outside of the jurisdiction because the data may not be controlled or protected sufficiently from malicious actors. These jurisdictions sacrifice flexibility of data management services in favor of providing a more secure level of protection for the data. Other jurisdictions allow data be managed outside of the jurisdiction to allow a greater flexibility of usage, but thereby sacrifice their ability to protect the data.

Conventional systems do not allow a data management system to store and use data outside of a jurisdiction while still allowing the jurisdiction complete control over the usage of such sensitive data.

DETAILED DESCRIPTION

Example System Architecture

Figure 1:
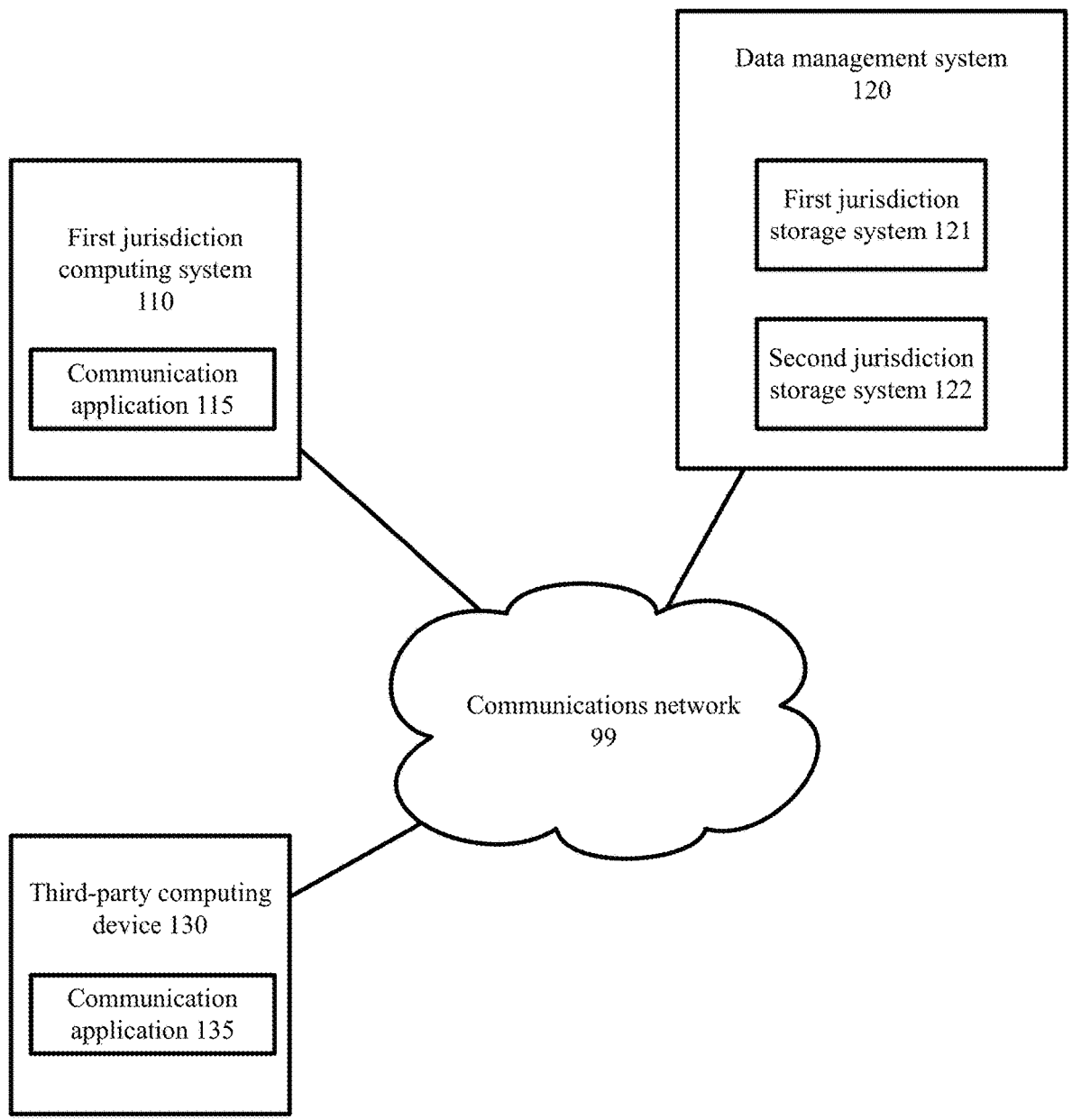
FIG. 1 is a block diagram depicting a system to provide data management security across jurisdictional boundaries using tokenization of sensitive data.

FIG. 1 is a block diagram depicting a system to provide data management security across jurisdictional boundaries using tokenization of sensitive data. As depicted in FIG. 1, the architecture 100 includes a first jurisdiction computing system 110, a data management system 120, and a third-party computing device 130 that are connected by communications network 99.

Each network, such as communication network 99, includes a wired or wireless telecommunication mechanism and/or protocol by which the components depicted in FIG. 1 can exchange data. For example, each network 99 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, Wi-Fi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing system or device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any other processor-driven device.

In the example embodiment depicted in FIG. 1, the first jurisdiction computing system 110 is operated by an end-user, client, client operator, or other user or representative of the first jurisdiction that may use the first jurisdiction computing system 110 to communicate with data management system 120, a third-party computing device 130, or other device to access or provide services or data. While each server, system, and device shown in the architecture is represented by one instance of the server, system, or device, multiple instances of each can be used.

In FIG. 1, the first jurisdiction computing system 110 includes a data storage unit (not shown) accessible by a communication application 115. The communication application 115 on a device of the first jurisdiction computing system 110 may be, for example, a web browser application or a stand-alone application, to view, download, upload, or otherwise access documents, user interfaces, or web pages via the networks 99. The communication application 115 can interact with web servers or other computing devices connected to the network 99, such as by conducting and authorizing an interaction with the data management system 120, a third-party computing device 130, or other device to access services.

The first jurisdiction computing system 110 may be a system of a government or agency of the first jurisdiction. In an example, the first jurisdiction computing system 110 is a system of a data security agency tasked by the jurisdiction to perform functions to secure the data of the people and entities of the first jurisdiction.

The user may use the first jurisdiction computing system 110 to input rules or regulations, approve requests from a third-party system 130, propagate new data tokenization protocols, provide detokenization services, or perform any other actions described in the methods herein.

As shown in FIG. 1, the data management system 120 includes a first jurisdiction storage system 121 located in the first jurisdiction and/or a second jurisdiction storage system 122 located in at least one second jurisdiction. The storage systems 121, 122 are accessible by the data management system 120 or any computing device or system of the data management system 120. The storage systems 121, 122 may manage or store databases or other types of data storage formats. The second jurisdiction storage system 122 may include storage devices or systems in a single second jurisdiction or in any other number of jurisdictions.

The data management system 120 represents any device, computing system, organization, cloud computing system, or other device or system that is suitable to manage data for clients, institutions, governments, businesses, users, or any other entities. The data may be stored, distributed, assessed, received, processed, analyzed, or otherwise managed by the data management system 120. The data management system 120 may perform the methods described herein to protect the security and confidentiality of any data provided by the first jurisdiction computing system 110. The data management system 120 may perform the methods described herein in one or more locations within or outside of the first jurisdiction. For example, the data management system 120 may store data on a storage device located in the first jurisdiction and also on a storage device located in a second jurisdiction.

In FIG. 1, the third-party computing device 130 includes a data storage unit (not shown) accessible by a communication application 135. The third-party computing device 130 may represent a device, a server, a network, or any other device or system that performs any actions using data stored in the data management system 120. The communication application 135 on the third-party computing device 130 may be, for example, a web browser application or a stand-alone application, to view, download, upload, or otherwise access documents, user interfaces, or web pages via the networks 99. The communication application 135 can interact with web servers or other computing devices connected to the network 99, such as by conducting and authorizing an interaction with the data management system 120, first jurisdiction computing system 110, or other device to access and use data. An operator of the third-party computing device 130 may use the data for any suitable purpose, such as managing an account, processing transactions, or allowing access.

Figure 5:
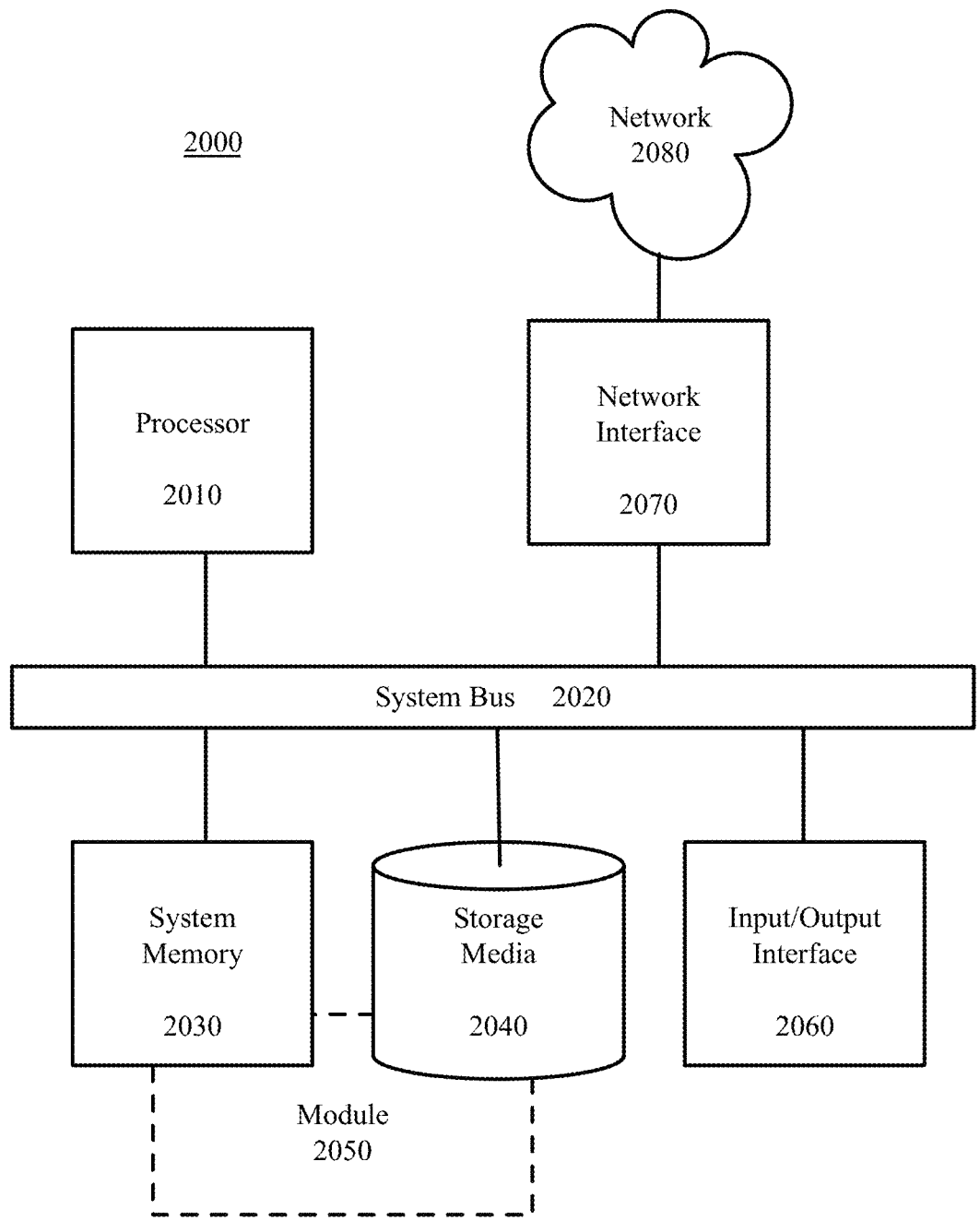
FIG. 5 depicts a computing machine and a module.

In example embodiments, the network computing devices and any other computing machines associated with the technology presented herein may be any type of computing machine such as, but not limited to, those discussed in more detail with respect to FIG. 5. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 5. The computing machines discussed herein may communicate with one another, as well as with other computing machines or communication systems over one or more networks, such as network 99. The network 99 may include any type of data or communications network, including any of the network technology discussed with respect to FIG. 5.

Example Embodiments

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology provides methods and systems to allow global usage of data while allowing regional jurisdictions control over such sensitive data. Different jurisdictions, such as a nation or a state, may declare types of data from that jurisdiction as sensitive data and that the sensitive data is not to be discoverable by a third party. For example, a jurisdiction may declare that personally identifiable information ("PII") associated with a person living in that jurisdiction is sensitive.

A global data management system stores data in many different jurisdictions to allow for businesses, institutions, and users to use the data in the global economy. When a certain jurisdiction does not allow sensitive data to be stored outside of the jurisdiction of the data's owner, the data may not be as useful as users perform actions outside of the jurisdiction. The global data management needs a method of storing and using the data outside of the jurisdiction while still allowing the jurisdiction control over the sensitive data.

The data management system provides a system that allows the data to be shared across jurisdiction boundaries with complete auditability, traceability, and compliance. The data management system provides a system that allows a first jurisdiction computing device to control the usage of the data. The software communication technologies allow the first jurisdiction computing device to propagate rules, tokenization protocols, and updates to the data management system to manage the sensitive data. In certain examples, functions described herein may be performed by either the data management system or the first jurisdiction computing device. In certain examples, the first jurisdiction computing device communicates instructions for actions to be taken by the data management system.

The data management system or a first jurisdiction computing device determines a type or category of each instance of data to be stored and used. The data management system or a first jurisdiction computing device identifies any data that is designated as sensitive by the first jurisdiction providing the data. The data management system or a first jurisdiction computing device then tokenizes any sensitive data before transferring the data outside of the first jurisdiction.

After receiving the data outside of the first jurisdiction, the data management system or a first jurisdiction computing device controls which third party or other system is permitted to access the sensitive data. The data management system or a first jurisdiction computing device detokenizes the data when the data is to be used for an approved purpose by an approved party. If the first jurisdiction has a change in permissions for sensitive data, the jurisdiction can propagate a tokenization to all data stored in the data management system outside of the jurisdiction. For example, the jurisdiction can change the permissions to prevent detokenization of a particular data field or for a particular third party. Further, data that is not currently tokenized may be subsequently tokenized when directed by the first jurisdiction.

The data management system thus allows a first jurisdiction complete control over data from that first jurisdiction despite the data being stored and used outside of the first jurisdiction. The globalization of data process acknowledges the complexities of the regional business processes, regulatory requirements, and vast array of products to produce a harmonized and unified global data source. The system provides real-time data synchronization capabilities.

The system provides that data stored and communicated across jurisdictions follows a very rigorous process of reviews, control checks, and conservatively tokenizes the sensitive data across all jurisdictions. The system provides an end-to-end view of user accounts and activities regardless of the geographic location of the activities. Further, by allowing data management systems to operate across territorial and jurisdictional boundaries, confusion between account data storage processors is avoided. That is, with a single data management system, user accounts are not stored by different entities in each different jurisdiction, and the single system is able to more efficiently manage the data.

The examples for embodiments of the invention may employ computer hardware and software, including, without limitation, one or more processors coupled to memory and non-transitory computer-readable storage media with one or more executable computer application programs stored thereon, which instruct the processors to perform such methods.

Figure 2:
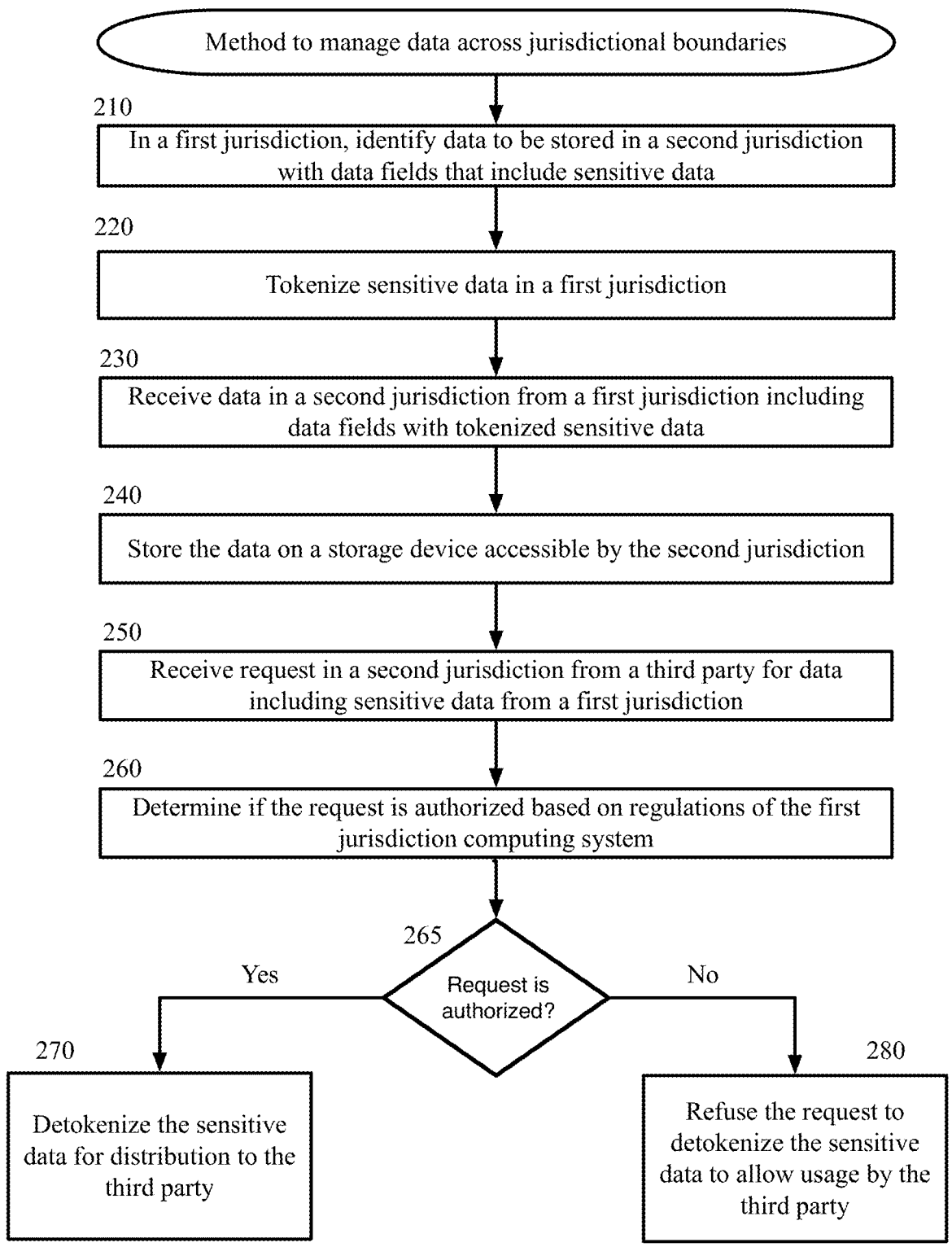
FIG. 2 is a block flow diagram depicting a method to provide data management security across jurisdictional boundaries using tokenization of sensitive data.
Figure 3:
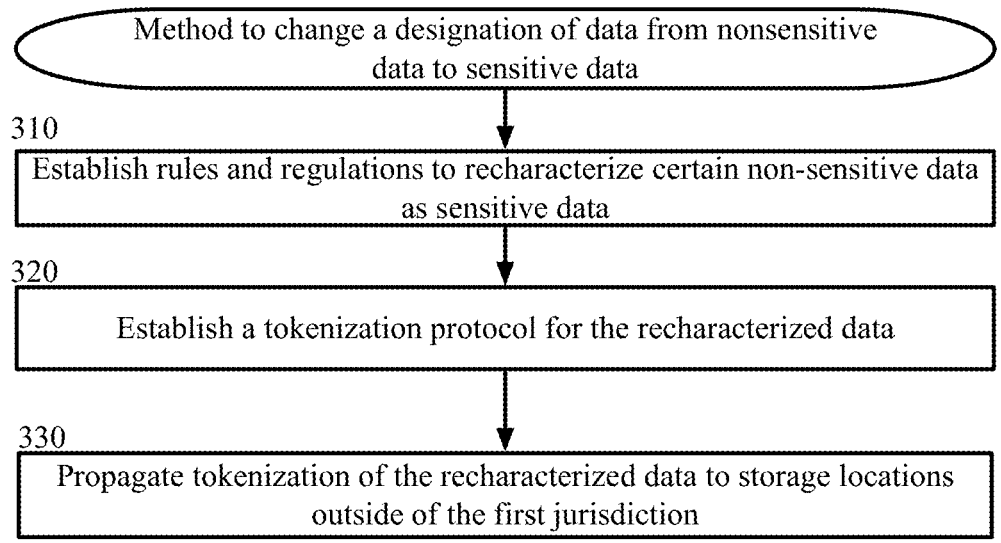
FIG. 3 block flow diagram depicting a method to change a designation of data from non-sensitive data to sensitive data.

The example methods illustrated in FIGS. 2-3 are described hereinafter with respect to the components of the example communications and processing architecture 100.

FIG. 2 is a block flow diagram depicting a method to provide data management security across jurisdictional boundaries using tokenization of sensitive data.

In block 210, the first jurisdiction computing system 110 identifies data to be stored in a second jurisdiction with data fields that include sensitive data. Different jurisdictions, such as a nation or a state, may declare different types of data from that jurisdiction as sensitive data that is not to be discoverable by a third party without express permission. For example, a jurisdiction may declare that personally identifiable information ("PII") associated with a person living in that jurisdiction is sensitive, such as phone numbers, addresses, or names. In another example, all financial information of entities residing in a country are considered sensitive. In another example, data related to national security interests are considered sensitive. In another example, certain demographic data about a person in the jurisdiction is considered to be sensitive, such as age, race, marital status, or any other demographic data.

In an example, the data of an entity in the first jurisdiction may be used to perform business operations in a second jurisdiction. For example, a company headquartered a first country may have customers and operations in the first country, but also operations and customers in other countries. If a customer of the entity in the first country requires services of the entity that is performed in a second country, the operations in the second country will require potentially sensitive data of that customer, such as an email address to use to deliver a product.

The data may be selected for storage or usage in the second jurisdiction by the entity in the first jurisdiction. The entity may be obligated by law or regulation to treat certain data as sensitive. In another example, the entity is obligated by corporate policy or other policy to treat certain data as sensitive. The data may be analyzed, examined, or otherwise processed to determine if any sensitive data is included in one or more data fields of the data selected for transfer out of the first jurisdiction. The processing of the data may be performed by a system within the entity, such as an algorithm or other computing function that identifies sensitive data within the set of data. In another example, the processing of the data may be performed by a function of the first jurisdiction computing system 110.

In another example, the processing of the data may be performed by the data management system 120. For example, the data management system 120 may receive the data in the first jurisdiction and desire to transfer the data out of the first jurisdiction for storage and use. The data management system 120 would analyze the data before the transfer to identify sensitive data.

The sensitive data is identified in one or more data fields of the data to be transferred and noted as such. The data is filtered for content, identifiers, metadata, or any other data characteristic that identifies the data as sensitive. When sensitive data is recognized based on one of the features, content, or characteristics, the data is labeled, segregated, flagged, or otherwise characterized as sensitive data. The existence of the sensitive data and the storage location of the sensitive data is logged and stored to allow traceability of the sensitive data. If a leak of the sensitive data occurs, the route of communication and storage of the data may be identified to identify a source of the disclosure.

In block 220, the sensitive data is tokenized in a first jurisdiction. The data is tokenized such that only a user of the data with access to a detokenization protocol is able to read, copy, modify, or otherwise use the data. The process of tokenizing data includes substituting sensitive data with equivalent non-sensitive data. The non-sensitive, replacement data is called a token. Tokens can be created by one of multiple tokenization processes. For example, a token may be created via a mathematically reversible cryptographic function with a key. In another example, a token may be created using a nonreversible function, such as a hash function. In another example, a token may be created using an index function or randomly generated number. Other tokenization processes may be used. When a tokenized data item is seen by a third-party, the token, non-sensitive data is the only data that is exposed. In an example, the sensitive information that the token represents is stored safely in a centralized server or other storage location known as a token vault. The holder of the token vault is the only entity that is able to map the token back to the original sensitive data.

When the first jurisdiction computing system 110 tokenizes the data or controls the tokenization of the data, the first jurisdiction computing system 110 maintains control over what entities or users may access the data.

In block 230, the data management system 120 receives data in a second jurisdiction from a first jurisdiction including data fields with tokenized sensitive data. After tokenizing the sensitive data, the first jurisdiction computing system 110 transfers the data without a fear of the sensitive data being seen by unauthorized observers. In another example, the data is transferred to the data management system 120 before the tokenization process with the assurance that the data management system 120 will tokenize the data upon receipt. The data management system 120 may be obligated to tokenize the data by statute, regulation, contract, agreement, or any other binding mechanism.

In block 240, the data management system 120 stores the data on a second jurisdiction storage system 122 accessible by the second jurisdiction. The data may be stored in any location agreed to by the first jurisdiction. The data may be stored in the second location, in the first location, in a cloud computing environment, or any other suitable location.

In an example, the data is stored in a database on a second jurisdiction storage system 122, on a first jurisdiction storage system 121, or both. The data may be stored as raw data, sorted data, filtered data, or using any other type of data storage process.

In block 250, the data management system 120 receives in a second jurisdiction a request from a third party for data including sensitive data from a first jurisdiction. In the example, a third-party computing device 130 communicates a request to the data management system 120 for data of an entity from inside the first jurisdiction.

In a continuing example, the third party is an entity that is conducting a transaction with an entity from the first jurisdiction. The third party is an organization that is located in the second jurisdiction. The third party requires sensitive banking data for the transacting entity to conduct the transaction. The third party computing device 130 submits a request to the data management system 120 for the required banking data. The request includes a request for data that is flagged as sensitive and is tokenized.

In block 260, the data management system 120 determines if the request is authorized based on regulations of the first jurisdiction computing system 110. The data management system 120 determines that at least one of the data fields of the requested data is tokenized. For example, the data management system 120 may recognize flagged data, data in a file noted as sensitive, or recognize that the data in the file is tokenized.

In response to recognizing that the request includes a request for tokenized data, the data management system 120 determines if the third party that requested the data is authorized to receive detokenized data. In certain examples, the data management system 120 may consult a list of authorized users and compare the request to a database that specifies data that may be shared with certain requesters. The data management system 120 may consult with the first jurisdiction computing system 110 to request authorization regarding the third party. The data management system 120 may request an authorization code or verification from the third-party computing device 130. In any other suitable manner, the data management system 120 may verify if the third party may receive detokenized data.

In block 265, if the data management system 120 determines that the request is authorized, then the method 200 proceeds to block 270. If the data management system 120 determines that the request is not authorized, then the method 200 proceeds to block 280.

Following the Yes path from block 265, in block 270, the data management system 120 detokenizes the sensitive data for distribution to the third party. If the third party is determined to be authorized to receive the detokenized data, the data management system 120 may perform any suitable method to provide the detokenized data to the third-party computing device 130. In an example, the data management system 120 detokenizes the data with a detokenization protocol provided by the first jurisdiction computing system 110, such as by comparing the data to a key provided by the first jurisdiction computing system 110.

In another example, the data management system 120 provides a request to the first jurisdiction computing system 110 to provide a randomly generated number associated with the tokenization to allow detokenization. In another example, a detokenization key is provided to the third-party computing device 130 to allow the third-party computing device 130 to detokenize the data. Any other suitable process may be used.

Following the No path from block 265, in block 280, the first jurisdiction computing system 110 or the data management system 120 refuses the request to detokenize the sensitive data to allow usage by the third-party computing device 130. When the request is denied, the third party is not allowed to receive the sensitive data. Upon the denial, the data management system 120 does not detokenize the data for the third-party computing device 130. The data may be withheld from the third-party computing device 130 or the data may still be transmitted, but the data is transmitted while still tokenized. The third-party computing device 130 is incapable of detokenizing or otherwise understanding the tokenized data. In examples in which the detokenization is performed by the first jurisdiction computing system 110, the first jurisdiction computing system 110 refuses the request to detokenize.

The third party may receive a notification from the data management system 120 or the first jurisdiction computing system 110 that the request is denied. The notification may include an explanation for the denial or instructions to appeal the denial.

FIG. 3 block flow diagram depicting a method 300 to change a designation of data from non-sensitive data to sensitive data.

In block 310, the first jurisdiction computing system 110 establishes rules and regulations to recharacterize certain non-sensitive data as sensitive data. In an example, a government entity in the first jurisdiction creates a new regulation that a certain type of personally identifiable information ("PII"), such as birthdate of a user living in the first jurisdiction, is now classified as sensitive information. In the example, the birthdate was not previously sensitive information. The birthdate was previously distributed to the data management system 120 out of the first jurisdiction and was stored without being tokenized. Third party requests for the birthdate of the user were previously granted.

Based upon the new regulations, the birthdate should be identified as sensitive and should not be distributed to third parties. However, the birthdate is still being stored on the data management system 120 without being tokenized for data sets transmitted before the regulation.

Any other example of a change of non-sensitive data to sensitive data may be performed in the first jurisdiction. The change may be for any suitable reason, such as a new law, a new banking regulation, a new government agency regulation, or for any other reason.

In block 320, the first jurisdiction computing system 110 establishes a tokenization protocol for the recharacterized data. The first jurisdiction computing system 110 may perform any process to tokenize the newly sensitive data. For example, the first jurisdiction computing system 110 may create a mathematically reversible cryptographic function with a key for each instance of the recharacterized data. Any other tokenization process may be used.

In block 330, the first jurisdiction computing system 110 propagates a tokenization of the recharacterized data to storage locations outside of the first jurisdiction. The first jurisdiction computing system 110 maintains control over the tokenization process even though the data is stored on a second jurisdiction storage system 122. The sensitive data is accessed in the second jurisdiction storage system 122, tokenized, and restored. The first jurisdiction computing system 110 is provided with complete control over the tokenization process.

In another example, the first jurisdiction computing system 110 propagates instructions to the data management system 120 to tokenize the recharacterized data. In the example, the data management system 120 performs the tokenization based on the instructions of the first jurisdiction computing system 110. The first jurisdiction computing system 110 may provide the tokenization protocol for the data management system 120 system to employ.

The recharacterized sensitive data stored in the second jurisdiction storage system 122 is now tokenized and unusable by a non-authorized user or third party. The first jurisdiction has maintained control over the data even though the data was stored outside of the first jurisdiction.

Figure 4:
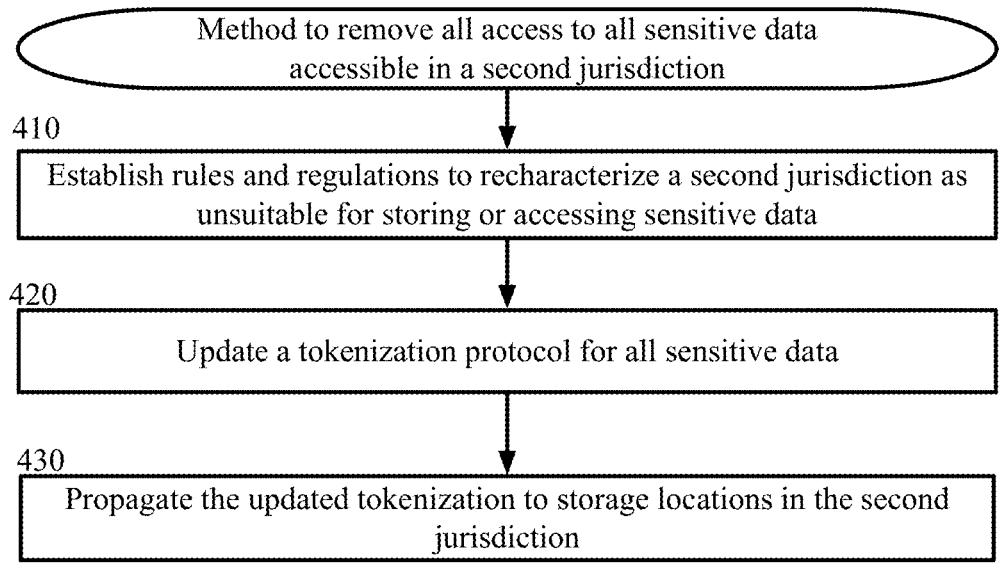
FIG. 4 block flow diagram depicting a method to remove access to all sensitive data in a second jurisdiction.

FIG. 4 block flow diagram depicting a method 400 to remove access to all sensitive data accessible in a second jurisdiction.

In block 410, the first jurisdiction computing system 110 establishes rules and regulations to recharacterize a second jurisdiction as unsuitable for storing or accessing sensitive data. In an example, a government entity in the first jurisdiction creates a new regulation that a certain jurisdiction, such as a nation or a state, is now classified as a jurisdiction that is not allowed to have access to sensitive information or store sensitive information.

In the example, the second jurisdiction was previously allowed to store data as described in the method 200 herein. Based upon the new regulations, the jurisdiction is now banned by the first jurisdiction from storing sensitive data. For example, the second jurisdiction may have had a change of leadership, a change in banking regulations, an increase in financial crimes, or for any other reason become a higher risk jurisdiction.

In block 420, the first jurisdiction computing system 110 updates a tokenization protocol for all sensitive data. The first jurisdiction computing system 110 may perform any process to tokenize the data. For example, the first jurisdiction computing system 110 may create a mathematically reversible cryptographic function with a key for each instance of the recharacterized data. Any other tokenization process may be used. Even if the data was previously tokenized, the updated tokenization uses a new tokenization protocol to which the second jurisdiction does not have access.

In block 430, the first jurisdiction computing system 110 propagates the updated tokenization to storage locations in the second jurisdiction. The first jurisdiction computing system 110 maintains control over the tokenization process even though the data is stored on a second jurisdiction storage system 122. The sensitive data is accessed in the second jurisdiction storage system 122, retokenized, and restored. The first jurisdiction computing system 110 is provided with complete control over the tokenization process. The data management system 120 and any third parties located in the second jurisdiction are now unable to detokenize the sensitive data and the data is unusable.

In another example, the first jurisdiction computing system 110 propagates instructions to the data management system 120 to retokenize the recharacterized data. In the example, the data management system 120 performs the tokenization based on the updated instructions of the first jurisdiction computing system 110. The first jurisdiction computing system 110 may provide the updated tokenization protocol for the data management system 120 system to employ.

The sensitive data stored in the second jurisdiction storage system 122 is now tokenized and unusable by a non-authorized user or third party. The first jurisdiction has maintained control over the data even though the data was stored outside of the first jurisdiction.

Example Systems

FIG. 5 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, Fire Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A data management system, comprising:
   one or more first processors communicatively coupled to a first storage device operating on a first computing device in a first jurisdiction, wherein the one or more first processors execute application code instructions that are stored in the first storage device to:
   transmit data from the first computing device in the first jurisdiction to a second computing device in a second jurisdiction, the data comprising data fields with a first data field classified as a sensitive data field having sensitive data and a second data field classified as a non-sensitive data field having non-sensitive data, the sensitive data field being tokenized by the first computing device according to a first tokenization protocol before transfer;
   transmit detokenization controls to the second jurisdiction, the detokenization controls comprising conditions under which the second computing device may detokenize tokenized data;
   cause storage of the tokenized data on the second computing device in the second jurisdiction, wherein the second computing device is unable to access the data without satisfying the conditions;
   receive an indication that the second data field has been reclassified into a second sensitive data field;
   responsive to the indication that the second data field has been reclassified into the second sensitive data field, cause tokenization of the data in the second data field at the first computing device using a second tokenization protocol, wherein the tokenization generates new tokenized data for the second data field and renders the new tokenized data inaccessible to the second computing device until the tokenized data is retokenized; and
   propagate the new tokenized data to the second computing device in the second jurisdiction.

2. The data management system of claim 1, wherein the application code instructions for propagating the new tokenized data further cause the one or more first processors to:
   access the sensitive data in the second computing device in the second jurisdiction; and
   replace the second data field on the second computing device with the new tokenized data.

3. The data management system of claim 1, wherein the application code instructions further cause the one or more first processors to:
   identify the sensitive data by filtering the data for content, identifiers, metadata, or any other data characteristic that identifies the data as sensitive; and
   label the data as the sensitive data.

4. The data management system of claim 1, wherein the second tokenization protocol comprises a mathematically reversible cryptographic function with a key for each instance of the sensitive data.

5. The data management system of claim 1, wherein the detokenization controls comprise rules based on location of a third party.

6. The data management system of claim 1, wherein the detokenization controls comprise rules based on a legal agreement between a third party and the data management system.

7. The data management system of claim 1, wherein satisfaction of the conditions and detokenization of the data occurs in real time.

8. The data management system of claim 1, wherein detokenization of the data is only permitted for a third party within a particular geographic location or jurisdiction.

9. A method to provide data management security across jurisdictional boundaries, the method comprising:
   transmitting data from a first computing device in a first jurisdiction to a second computing device in a second jurisdiction, the data comprising data fields with a first data field classified as a sensitive data field having sensitive data and a second data field classified as a non-sensitive data field having non-sensitive data, the sensitive data field being tokenized by the first computing device according to a first tokenization protocol before transfer;
   transmit detokenization controls to the second jurisdiction, the detokenization controls comprising conditions under which the second computing device may detokenize tokenized data;
   cause storage of the tokenized data on the second computing device in the second jurisdiction, wherein the second computing device is unable to access the data without satisfying the conditions;
   receive an indication that the second data field has been reclassified into a second sensitive data field;
   responsive to the indication that the second data field has been reclassified into the second sensitive data field, cause tokenization of the data in the second data field at the first computing device using a second tokenization protocol, wherein the tokenization generates new tokenized data for the second data field and renders the new tokenized data inaccessible to the second computing device until the tokenized data is retokenized; and
   propagate the new tokenized data to the second computing device in the second jurisdiction.

10. The method of claim 9, wherein the detokenization controls comprise rules based on a legal agreement between two or more parties.

11. The method of claim 9, further comprising:
    identifying the sensitive data by filtering the data for content, identifiers, metadata, or any other data characteristic that identifies the data as sensitive; and
    labelling the data as sensitive.

12. The method of claim 9, propagating the new tokenized data further comprises:
- accessing the sensitive data in the second computing device in the second jurisdiction; and
- replacing the second data field on the second computing device with the new tokenized data.

13. The method of claim 9, wherein the second tokenization protocol comprises a mathematically reversible cryptographic function with a key for each instance of data.

14. The method of claim 9, wherein satisfaction of the conditions and detokenization of the data occurs in real time.

15. The method of claim 9, wherein detokenization of the data is only permitted for a third party within a particular geographic location or jurisdiction.

16. One or more non-transitory computer-readable media having computer-readable program instructions embodied thereon, the computer-readable program instructions causing one or more processors to:
- transmit data from a first computing device in a first jurisdiction to a second computing device in a second jurisdiction, the data comprising a first data field classified as a sensitive data field having sensitive data and a second data field classified as a non-sensitive data field having non-sensitive data, the sensitive data field being tokenized by the first computing device before transmission;
- transmit detokenization controls to the second jurisdiction, the detokenization controls comprising conditions under which the second computing device may detokenize tokenized data;
- cause storage of the tokenized data on the second computing device in the second jurisdiction, wherein the second computing device is unable to access the data without satisfying the conditions;
- receive an indication that the second data field has been reclassified into a second sensitive data field;
- responsive to the indication that the second data field has been reclassified into the second sensitive data field, cause tokenization of the data in the second data field at the first computing device using a second tokenization protocol, wherein the tokenization generates new tokenized data for the second data field and renders the new tokenized data inaccessible to the second computing device until the tokenized data is retokenized; and
- propagate the new tokenized data to the second computing device in the second jurisdiction.

17. The one or more non-transitory computer-readable media of claim 16, wherein the conditions are based on location.

18. The one or more non-transitory computer-readable media of claim 16, wherein the conditions are based on a legal agreement between a third party and a data management system.

19. The one or more non-transitory computer-readable media of claim 16, wherein detokenization of the data occurs in real time.

20. The one or more non-transitory computer-readable media of claim 16, further comprising:
- identifying the sensitive data by filtering the data for content, identifiers, metadata, or any other data characteristic that identifies the data as sensitive; and
- labelling the data as sensitive.

\* \* \* \* \*